(No Model.)   2 Sheets—Sheet 1.
M. HERZOG.
APPARATUS FOR THE DIALYSIS OF AIR.
No. 307,041.   Patented Oct. 21, 1884.
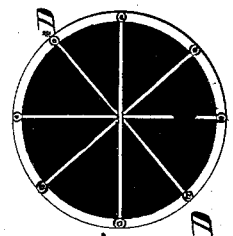
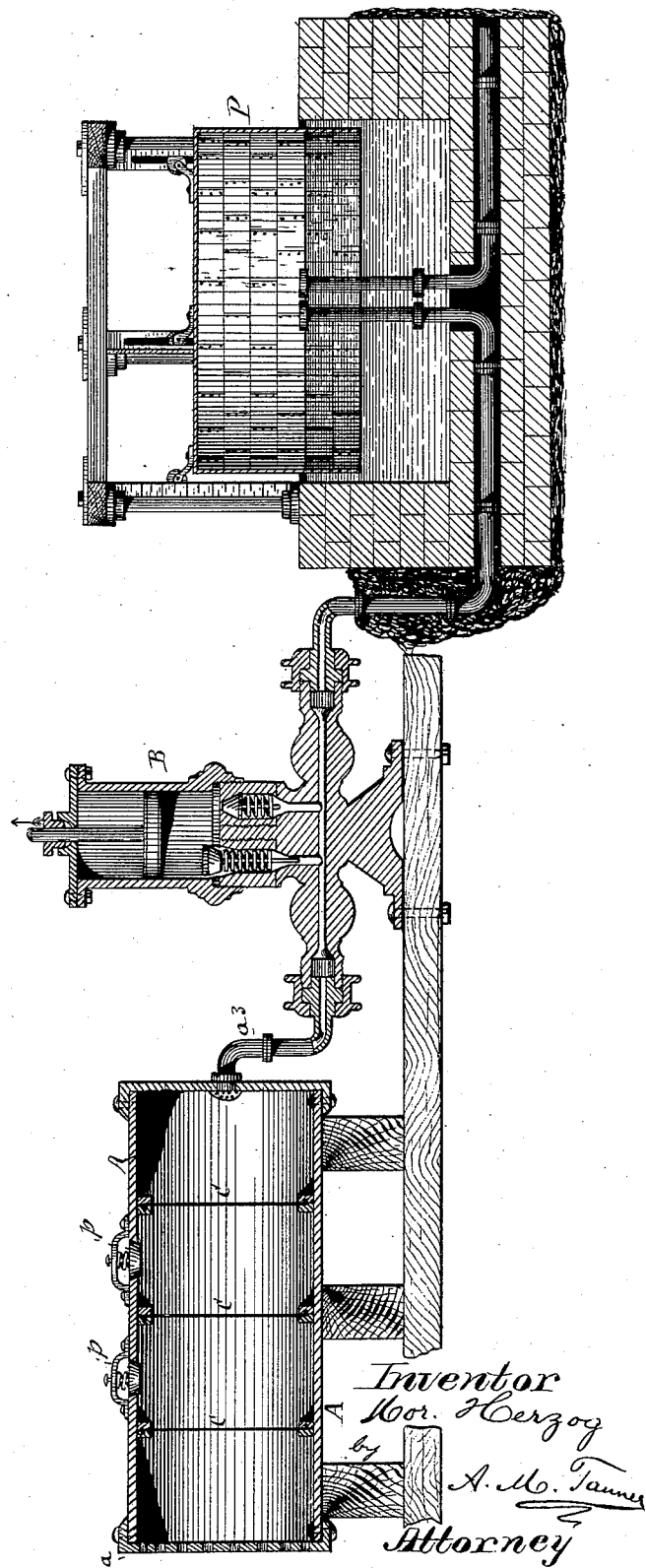

(No Model.) 2 Sheets—Sheet 2.
M. HERZOG.
APPARATUS FOR THE DIALYSIS OF AIR.
No. 307,041. Patented Oct. 21, 1884.
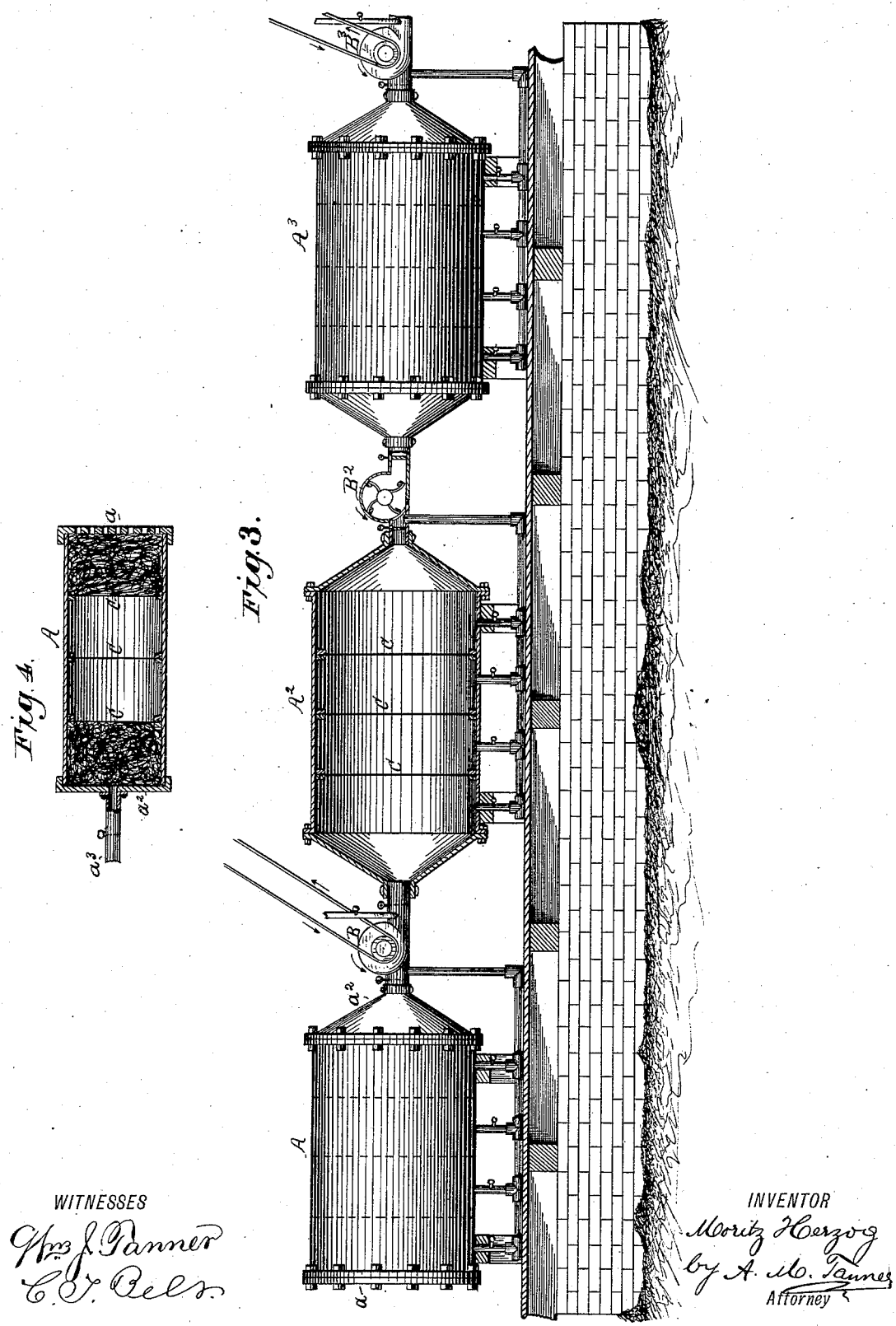

UNITED STATES PATENT OFFICE.

MORITZ HERZOG, OF HOBOKEN, NEW JERSEY, ASSIGNOR OF ONE-HALF TO SIMON J. FLATOW, LOUIS SIEBER, MAXIMILIAN CALM, WALDORF H. PHILLIPS, AND JAMES GILFILLAN, ALL OF NEW YORK, N. Y., GEORGE W. DRESSER, OF BOSTON, MASS., JOHN A. BELVIN, OF BROOKLYN, N. Y., AND RICHARD J. BRIGHT, OF INDIANAPOLIS, IND.

APPARATUS FOR THE DIALYSIS OF AIR.

SPECIFICATION forming part of Letters Patent No. 307,041, dated October 21, 1884.

Application filed August 7, 1883. (No model.)

*To all whom it may concern:*

Be it known that I, MORITZ HERZOG, a citizen of Austria-Hungary, residing at Hoboken, in the county of Hudson and State of New Jersey, have invented certain new and useful Improvements in Apparatus for the Dialysis of Air; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improved apparatus for obtaining superoxygenated air or oxygen for technical and industrial purposes. The principle involved is that of dialysis—a physical law made known by Professor Thomas Graham, who first made the observation that various kinds of gases do not pass through the pores of a thin membrane or sheet of caoutchouc with the same degree of velocity; that, for example, carbonic acid passes through more rapidly than hydrogen, and oxygen faster than nitrogen. Graham has indicated that atmospheric air, being separated from a vacuum-chamber by a silk membrane covered with black caoutchouc, is dialyzed by this membrane, and it is furthermore asserted by said Graham, in an elaborate report of his experiments published in the Journal of the Chemical Society of London, volume 5, page 235, that air dialyzed through a porous colloid septum generally contains forty-one per cent., but never more than forty-three per cent., of oxygen. This purely scientific principle or law of physics discovered by Graham has never been employed for the commercial or industrial production of oxygen or of atmospheric air rich in oxygen. In fact, all the experiments ever made by others have only resulted in the production of small quantities of dialyzed air in a long period of time, which is not an employment of the dialytic process in a manufacturing or industrial sense.

My invention, on the contrary, provides means whereby large quantities of oxygen or atmospheric air rich in oxygen can be obtained in a cheap, quick, and continuous manner; and to these ends it consists in the construction and combination of devices which will be hereinafter more fully described, and then set forth in the claims.

In the drawings, Figure 1 is a longitudinal sectional view of a dialyzer and exhaust apparatus combined therewith. Fig. 2 is a detail view of one of the dialyzing-membranes and its frame or holder; Fig. 3, a longitudinal view, showing the combination of three dialyzers and their exhaust and forcing devices in the form of rotary fans. Fig. 4 is a sectional view of a dialyzer having an absorbent packing for filtering the air or gases passing through the same.

The letter A designates a cylinder or casing, which is made of metal or other suitable material of a non-porous nature. This cylinder has a perforated end head, $a$, which is made detachable, and is secured in place by flanges and bolts or other appropriate devices. The other end head, $a^2$, of the cylinder is made solid, or is without the perforations of the head $a$, and has a central discharge-pipe, $a^3$, which communicates with an exhaust and compressing pump, B, or other apparatus for exhausting the contents of the cylinder and forcing the same into a holder or other devices located beyond the cylinder A. A series or a plurality of partition-walls, C, are arranged within the cylinder A, and serve to divide the same into several chambers or compartments. These partitions are constructed of metal frames or rings, in which are clamped membranes or diaphragms of caoutchouc, parchment, or other membranes that will answer for carrying out the dialytic process in the manner hereinafter set forth. The membranes are strengthened or braced by means of strips or wires D of galvanized iron, which are set in the frames of said membranes and rest upon the surfaces of the latter, as is shown in Fig. 2. The frames and membranes constituting the partition-walls are firmly retained in position by means of bolts or screws, which pass through the cylinder and enter the peripheries of the membrane frames and holders. Other means, however, may be resorted to for holding the membrane-frames in position — as, for example, the latter can be clamped between the flanges of a sectional cylinder. The atmospheric air entering the cylinder A through the openings in its end head, $a$, passes into the chamber 1, in which a vacuum is produced by the operation of the pump B. The air present in this first chamber exerts a pressure upon the incoming air in a direction opposed to the direction of its flow, thereby decreasing the velocity of the movement. The air which enters the first chamber consists of $O_{21}+N_{79}$, and is caused to pass through the first membrane into the second chamber by the continuously-acting suction-pump B, it being understood that the vacuum created in the beginning in the second chamber is gradually filled by the air passing from the first chamber through its membrane or septum. The air or gas present in the second chamber has gained nine per cent. of oxygen, and this chamber contains oxygen, thirty and one-half per cent., and nitrogen, sixty-nine and one-half per cent. A further passage of the gas through a second septum into a third chamber will deprive the gas of another nine per cent. of nitrogen, and thus the gas entering said third chamber is composed of oxygen, forty per cent. and nitrogen, sixty per cent. The passage of this gas through the third septum into a fourth chamber will cause the dialytic action to go on the same as with the exhaustion of the second and third chambers, the fourth chamber in this instance forming the vacuous space, and receiving a gas which consists of oxygen and nitrogen in about equal proportions, to which I have applied the formula $N_2 O_2$, as it corresponds nearest to this formula. I have found that a further dialysis or passage of this resultant gas through other septums of the same chamber or cylinder will not increase the proportion of oxygen, and for this reason other septums than the three shown in the drawings would be superfluous for producing the gas to which I have applied the formula $N_2 O_2$. The exhauster B acts continuously, draws the gas from the last chamber of the dialyzer, and forces it through suitable conduits into a storage-vessel or gasometer, P. Valves $p$ are fitted in the top of the dialyzing-cylinder for discharging the nitrogen accumulating therein. These valves open in an outward direction, and need only to be applied to the intermediate chambers of the dialyzer.

Referring to Fig. 3, it will be seen that three dialyzers are combined in one plant, and provided each with a suction or exhaust apparatus. By this arrangement the gas or dialyzed air exhausted from the first cylinder, A, is delivered by the exhauster B into the second cylinder, $A^2$, which has an exhauster, $B^2$, at its exit, and that forces the gas into the third cylinder, $A^3$, in which the final dialysis takes place. The gas passing from the second cylinder consists of oxygen, 78.5 per cent., and nitrogen, 21.5 per cent., and the final product or gas coming from the third dialyzer is almost pure oxygen, it containing only slight traces of nitrogen.

As a resumé of my invention and its advantages and object, I would say that the production of a gas composed of oxygen and nitrogen in about equal proportions, or of almost pure oxygen, by the dialysis of atmospheric air is a practical solution of the problem suggested by Graham, Joyce, and Hofmann of attaining the means on a large scale of eliminating nitrogen from atmospheric air by the dialytic process.

The uses of a gas rich in oxygen for industrial and technical purposes are too numerous to mention, and I will only briefly cite prominent uses, such as metallurgical and chemical processes, sanitary and remedial purposes, bleaching, ventilating, and brewing processes, in addition to its use in the manufacture of an illuminating-gas, set forth in another application for patent filed by me.

The specific proportions of the oxygen and nitrogen present in my gas make the same a very effective heating agent, and hence it is specially adapted for use in blast, steel, and other furnaces.

While the gas which I describe by the formula $N_2 O_2$ is sufficiently rich in oxygen to adapt it for numerous technical and industrial purposes, it is nevertheless manifest that a greater proportion of oxygen can be readily produced by repeating the dialytic process one or more times.

The process herein set forth of obtaining oxygen or superoxygenated air by the continuous dialysis of atmospheric air through colloid septa forms the subject-matter of a separate application for patent.

What I claim as new in the present case is—

1. An apparatus for separating oxygen or dialyzed or superoxygenated air from atmospheric air, consisting of a series of chambers, a series of colloid or caoutchouc septa, means for passing or drawing air into the first of said chambers, eliminating the nitrogen by the passage of said air through the series of colloid septa, and discharging the oxygen or superoxygenated air from the last of said chambers, and means for discharging the nitrogen remaining or resting in the different dialyzing-chambers, substantially as herein set forth.

2. An apparatus for separating oxygen from air, consisting of a series of independent drums or chambers provided with porous membranes or colloid septa for dividing said chambers into different compartments, and a vacuum apparatus attached to each dialyzing-drum, substantially as set forth.

In testimony whereof I affix my signature in presence of two witnesses.

MORITZ HERZOG.

Witnesses:
M. CALM,
ARTHUR SIMONSON.